(12) United States Patent
Traversa et al.

(10) Patent No.: US 7,557,155 B2
(45) Date of Patent: Jul. 7, 2009

(54) THERMOSETTING COMPOSITE MATERIAL PARTICULARLY FOR MANUFACTURING SANITARY ARTICLES AND KITCHEN SINKS

(75) Inventors: Giancarlo Traversa, Terracina (IT); Giorgio Davide Traversa, Terracina (IT)

(73) Assignee: Elleci S.p.A., Pontinia (IT)

( * ) Notice: Subject to any disclaimer, the term of this patent is extended or adjusted under 35 U.S.C. 154(b) by 184 days.

(21) Appl. No.: 10/784,981

(22) Filed: Feb. 25, 2004

(65) Prior Publication Data

US 2004/0249050 A1 Dec. 9, 2004

(30) Foreign Application Priority Data

Mar. 5, 2003 (IT) .......................... MI2003A0406

(51) Int. Cl.
| | | |
|---|---|---|
| *C08L 1/00* | (2006.01) | |
| *C08J 5/10* | (2006.01) | |
| *C08K 3/26* | (2006.01) | |
| *C08L 31/06* | (2006.01) | |
| *C08K 9/00* | (2006.01) | |
| *C08K 3/22* | (2006.01) | |
| *C08L 31/02* | (2006.01) | |

(52) U.S. Cl. .................... 524/494; 524/556; 524/425; 524/445; 524/437; 525/261; 525/302; 525/309; 523/204; 523/219; 523/527; 523/209

(58) Field of Classification Search ................. 524/494, 524/556, 423, 425; 525/261, 302, 309; 523/204, 523/219, 202

See application file for complete search history.

(56) References Cited

U.S. PATENT DOCUMENTS

| | | | | |
|---|---|---|---|---|
| 4,156,677 | A | * 5/1979 | Williams et al. ............. | 523/213 |
| 4,334,933 | A | * 6/1982 | Abe et al. .................... | 106/414 |
| 5,218,013 | A | * 6/1993 | Schock ........................ | 523/209 |
| 5,705,552 | A | * 1/1998 | Minghetti et al. ........... | 524/437 |
| 5,710,204 | A | * 1/1998 | Harke et al. ................. | 524/424 |
| 5,800,910 | A | 9/1998 | Fenzl et al. | |
| 5,877,246 | A | * 3/1999 | Leverrier ..................... | 524/425 |
| 2001/0041234 | A1 | * 11/2001 | Traversa et al. ............. | 428/35.7 |

FOREIGN PATENT DOCUMENTS

| | | | |
|---|---|---|---|
| EP | 0 725 105 | | 8/1996 |
| GB | 2333297 A | * | 4/1996 |
| GB | 2 333 297 | | 7/1999 |

* cited by examiner

*Primary Examiner*—Duane Smith
*Assistant Examiner*—Ives Wu
(74) *Attorney, Agent, or Firm*—Modiano & Associati; Albert Josif; Daniel J. O'Byrne

(57) ABSTRACT

A thermosetting composite material, particularly for manufacturing sanitary articles and kitchen sinks, comprising a polymeric matrix that incorporates a filler material distributed in the matrix, the filler material being constituted by glass particles, the preponderant fraction of which has a size distribution from 0.2 to 1.5 mm.

20 Claims, No Drawings

THERMOSETTING COMPOSITE MATERIAL PARTICULARLY FOR MANUFACTURING SANITARY ARTICLES AND KITCHEN SINKS

The present invention relates to a thermosetting composite material particularly for manufacturing sanitary articles and kitchen sinks.

BACKGROUND OF THE INVENTION

As is known, modern fitted sinks can be made of a thermosetting composite material by means of a mass that contains a resin which constitutes the matrix and a filler material that is mostly formed by mineral particles.

As disclosed for example in European patent EP 361101, the filler material is constituted, for approximately 50-85% by weight of the mass, by mineral particles constituted by natural quartz sand.

Other known solutions use cristobalite, which is obtained from quartz particles crystallized beforehand in a high-temperature furnace.

In both cases, the particles have a size from 0.1 to 2 mm.

The resulting articles, particularly fitted kitchen sinks, have on their exposed surface a weave-like structure that is substantially caused by the fact that during polymerization the resin shrinks more in its surface regions, which in the case of sinks are also the parts that are subject to wear.

Therefore, substantially, on the surface which is ultimately the surface that is used, many small hollows form between the filler particles that lie closer to the surface.

These articles, though being manufactured so as to have a scratch-resistant surface, may be subject to wear especially in the regions where intense abrasion occurs due to rubbing of pots, cutlery and the like, such as the bottom of the sink and the surface of the draining board.

A problem that is encountered with these articles is that the mineral particles at the surface are covered only by a thin layer of resin, which in practice renders the particle impermeable and prevents direct contact with liquids.

Over time, especially in the regions that are most affected by abrasion, the thin layer of resin is worn, thus placing the mineral particles in direct contact with the liquids that are present in the sink, such liquids being usually highly stain-forming, such as for example coffee, tomato juice, tea, and so forth.

Quartz particles are inherently porous and cristobalite is even more porous, since it is obtained by baking quartz in a high-temperature furnace, and this causes many microperforations in the quartz particles, making them even more porous and prone to absorb liquids in their mass.

When the mineral particles are no longer protected by the thin layer of resin, they inevitably absorb liquids and anything else that is present in the sink; this rapidly causes stains on the most heavily abraded surfaces of the sink.

Moreover, the quartz particles that remain exposed also act as an ideal medium for the deposition of organic material, thereby providing a microenvironment suitable for bacterial proliferation.

SUMMARY OF THE INVENTION

The aim of the invention is to solve the problems described above by providing a new type of thermosetting composite material that is particularly adapted for manufacturing fitted sinks, since it allows to have a perfectly impermeable surface even after a long period of use.

Within this aim, an object of the invention is to provide a composite material that allows to manufacture articles that do not stain due to absorption of liquids by the filler particles of said material.

Another object of the present invention is to provide a material that allows to obtain articles whose surface does not become an ideal medium for proliferation of germs and bacteria.

Another object of the present invention is to provide articles in which the surfaces that are subjected to stress are tougher than the surfaces obtained with the materials of the background art.

Another object of the present invention is to provide a thermosetting composite material that thanks to its particular manufacturing characteristics is capable of giving the greatest assurances of reliability and safety in use and further has a competitive cost, in addition to being easy to manufacture.

This aim and these and other objects that will become better apparent hereinafter are achieved by a thermosetting composite material particularly for manufacturing sanitary articles and kitchen sinks, comprising a polymeric matrix that incorporates a filler material distributed in said matrix, characterized in that said filler material is constituted by glass particles, the preponderant fraction, i.e. more than 50%, of which has a size distribution comprised from 0.2 to 1.5 mm.

Further characteristics and advantages of the invention will become better apparent from the description of a possible embodiment of the thermosetting composite material particularly for manufacturing sanitary articles and kitchen sinks.

DESCRIPTION OF THE PREFERRED EMBODIMENTS

The material comprises a polymeric matrix, which is obtained from a solution of polymethyl methacrylate in methyl methacrylate in which a filler material is introduced and incorporated in the matrix, and, preferably evenly distributed in the mass.

An important feature of the invention consists in that the filler material is obtained by means of glass particles, the preponderant fraction of which has a size distribution comprised from 0.2 to 1.5 mm.

These particles are easily commercially available, since they are the particles normally used for industrial sanding, for castings and for producing particular types of paints.

The particles can be spherical or irregular, although preference is given to the use of spherical ones or of a mixture of spherical particles and irregular particles.

The glass particles have a much more compact structure than quartz and cristobalite particles, and with respect to the background art there is the considerable advantage of not having microfractures or porosity, so that in the manufactured article the particles retain their impermeableness to liquids and organic substances even if the thin layer of resin is worn, consequently obtaining a surface that does not stain and remains unchanged over time.

The filler material is introduced in a percentage comprised from 60 to 85%, preferably 70-80% by weight.

The polymeric matrix, which is introduced in a percentage comprised from 40 to 15%, is formed by a syrup of polymethyl methacrylate in methyl methacrylate, in which the polymethyl methacrylate is from 25 to 30% by weight.

It is also possible to provide a catalyst in a percentage from 0.5 to 0.8%.

The mass of the composite material can optionally be colored by introducing coloring pastes in a polymeric matrix in a concentration from 1 to 5% with respect to the weight of the matrix.

The clear glass particles, inserted in a colored matrix in a percentage from 1 to 2%, allow to obtain onyx-effect articles that give a perception of three-dimensionality of the color in the mass, since the color does not hide.

If coloring pastes in an amount close to 5% are introduced in the matrix, the color hides and therefore a substantially two-dimensional effect is obtained.

It should be noted that if the surface layer of resin is worn out completely, the clear glass particles allow to see the underlying colored resin, keeping the original appearance of the sink unchanged.

It is optionally possible to use colored glass particles; in this case, the matrix can be colorless and obviously, a different visual effect, characterized by a stippled two-dimensional coloring, is obtained.

The choice of one particle type or the other is exclusively dependent on the aesthetic characteristics being sought.

The glass particles used can be advantageously subjected to a silanization process, which in practice coats the particles with organofunctional silanes, which facilitate adhesion between the organic matrix and the inorganic filler material, thus improving the mechanical characteristics of the composite and in particular its toughness, i.e., its ability to withstand instantaneous impacts and stresses.

Experimental tests that have been conducted have shown that it is possible to silanize glass particles by means of mercaptosilanes, which bind covalently to the particle but act as chain transfer agents in the polymerization process.

Mercaptosilanes reduce the molecular weight of the polymer and allow to obtain a polymeric matrix that is more elastic and therefore less sensitive to impacts.

As mentioned earlier, the concentration of glass particles in the molded mass is from 60 to 85%, and the glass particles, which mostly have a size from 0.2 to 1.5 mm, preferably mostly have a size from 0.4 mm to 0.9 mm.

In order to control the settling of the glass particles in the still-liquid mass ready to be injected into the mold, additives such as for example BYK410 are used. The most suitable technology for molding the material described above, which allows to provide uniform particle distribution, can be found for example in EPA 02024543.7, which is herein enclosed by reference.

The uniformity of distribution of the filler material allows to provide a structure that is particularly adapted to withstand thermal shocks and violent impacts.

Experimental tests that have been conducted have shown that an optimum characteristic is the use of a composition that has 70-80% by weight of glass particles, 30-20% by weight of a syrup of polymethyl methacrylate in methyl methacrylate, with a polymethyl methacrylate percentage from 25 to 30% by weight, a catalyst such as PEROXAN LP by Oxido in a percentage of 0.5-0.8%, and a catalyst such as PEROXAN BCC by Oxido in a percentage from 0.5 to 0.8%.

The catalysts must be calculated in relation to the weight of the syrup.

It is also possible to add 1-2.5% by weight of the syrup of cross-linking agent, 0.1-0.2% release agent such as BYK-W9050, 0.2-1% antisettling agent such as BYK-410 and 0.5-1% organofunctional silane.

The thermosetting composite material, described above allows to obtain articles and in particular fitted sinks in which surface porosity is eliminated completely even after a long period of use, which can cause wear in the polymeric matrix, exposing to the outside the filler material; the glass particles that constitute the filler material behave like impermeabilizing elements and therefore all the problems described for the background art are not observed.

Another important aspect of the invention is constituted by the fact that by using the mixture described above it is possible to obtain better dimensional stability of the manufactured article with respect to the solutions of the background art. For example, in the manufacture of a sink with a mold measuring 1116×500 mm, when using conventional mixtures an article measuring approximately 1114×499 mm is obtained, whereas by using the mixture according to the invention the dimensions are substantially unchanged.

The invention thus conceived is susceptible of numerous modifications and variations, all of which are within the scope of the appended claims.

All the details may further be replaced with other technically equivalent elements.

The disclosures in Italian Patent Application No. MI2003A000406 from which this application claims priority are incorporated herein by reference.

What is claimed is:

1. A thermosetting composite material, particularly for manufacturing sanitary articles and kitchen sinks, comprising a polymeric matrix that incorporates a filler material distributed in said matrix and comprised therein in a percentage of more than 60% up to 85%, wherein said filler material is constituted by glass particles the preponderant fraction of which has a size distribution from 0.2 to 1.5 mm.

2. The composite material according to claim 1, wherein said polymeric matrix is constituted by a solution of polymethyl methacrylate in methyl methacrylate.

3. The composite material according to claim 1, wherein said polymeric matrix is introduced in a percentage from 40 to 15%.

4. The composite material according to claim 1, wherein said polymeric matrix is constituted by a syrup of polymethyl methacrylate in methyl methacrylate, in which the polymethyl methacrylate percentage is from 25 to 30% by weight of the matrix.

5. The composite material according to claim 1, comprising a catalyst in a percentage from 0.5 to 0.8%.

6. The composite material according to claim 1, comprising, in said polymeric matrix, coloring fractions at a concentration from 1 to 5% with respect to the weight of the matrix.

7. The composite material according to claim 1, wherein said filler is constituted by colored glass.

8. The composite material according to claim 1, wherein said filler material has a coating layer made of organofunctional silane particles.

9. The composite material according to claim 5, wherein the preponderant fraction of said glass particles have a size from 0.4 to 0.9 mm.

10. The composite material according to claim 5, comprising from 1 to 2.5% by weight with respect to the syrup of a cross-linking agent.

11. The composite material according to claim 5, comprising from 0.1 to 0.2% by weight of said syrup of a release agent.

12. The composite material according to claim 5, comprising from 0.2 to 1% by weight of said syrup of an antisettling agent.

13. The composite material according to claim 5, comprising from 0.5 to 1% by weight of said syrup of organofunctional silanes.

14. A thermosetting composite material, particularly for manufacturing sanitary articles and kitchen sinks, comprising a polymeric matrix that incorporates a filler material distributed in said matrix, wherein said filler material is comprised in a percentage of more than 60% up to 85% and is constituted by glass particles the preponderant fraction of which has a size distribution from 0.2 to 1.5 mm, the glass particles being coated with organofunctional silane.

15. A thermosetting composite material according to claim 14, wherein the glass particles are coated with mercaptosilanes.

16. A thermosetting composite material, particularly for manufacturing sanitary articles and kitchen sinks, comprising a polymeric matrix that incorporates a filler material distributed in said matrix, wherein said filler material is constituted by glass particles the preponderant fraction of which has a size distribution from 0.2 to 1.5 mm, wherein said polymeric matrix is constituted by a syrup of polymethyl methacrylate in methyl methacrylate, in which the polymethyl methacrylate percentage is from more than 25 to 30% by weight of the matrix.

17. A thermosetting composite material, particularly for manufacturing sanitary articles and kitchen sinks, comprising a polymeric matrix that incorporates a filler material distributed in said matrix, wherein said filler material is constituted by glass particles the preponderant fraction of which has a size distribution from 0.2 to 1.5 mm and said polymeric matrix is introduced in a percentage from 40 to 15%.

18. The composite material according to claim 17, wherein said polymeric matrix is constituted by a syrup of polymethyl methacrylate in methyl methacrylate, in which the polymethyl methacrylate percentage is from 25 to 30% by weight of the matrix.

19. The composite material according to claim 17, wherein said filler material is comprised in a percentage from 60 to 85%.

20. The composite material according to claim 3, wherein the filler material is comprised in a percentage from 70 to 80% by weight.

\* \* \* \* \*